Figure 1:
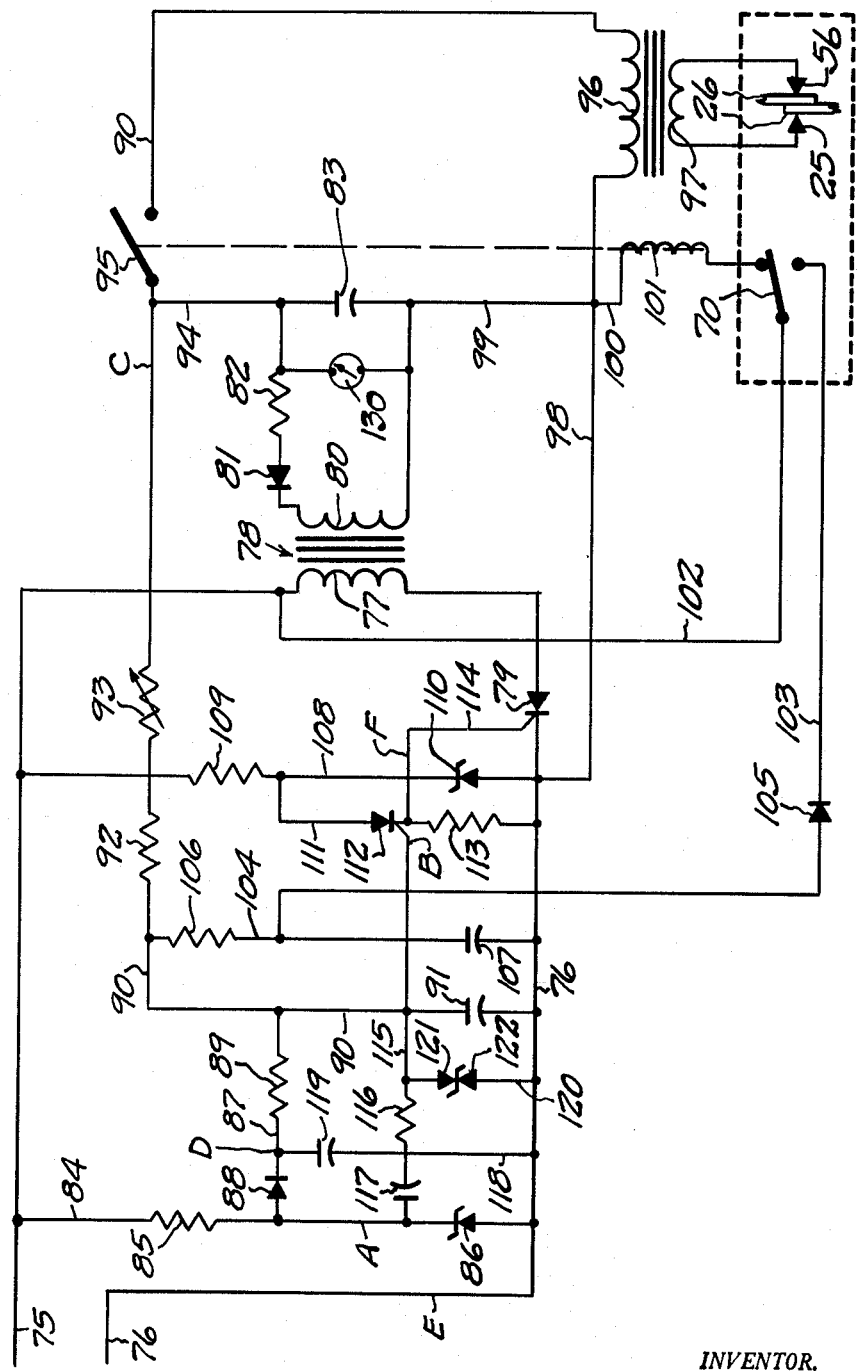

*INVENTOR.*
ANDREW A. MUELLER
*BY*
Eugene C. Knoblock
ATTORNEY

United States Patent Office 3,248,638
Patented Apr. 26, 1966

3,248,638
STORED ENERGY RESISTANCE WELDING
POWER SUPPLY
Andrew A. Mueller, South Bend, Ind., assignor to Wells
Electronics, Inc., South Bend, Ind., a corporation of
Indiana
Filed Aug. 28, 1962, Ser. No. 220,003
16 Claims. (Cl. 321—18)

This invention relates to improvements in stored energy resistance welding power supplies, and particularly to a power supply utilizing solid state electronic components and capable of accurate regulation.

This power supply is particularly suitable for use with welding apparatus of the character illustrated in my copending patent application for Precision Electric Welding Head, Ser. No. 190,622, filed April 27, 1962, now Patent No. 3,127,501.

The primary object of this invention is to provide a power supply of this character having a very close regulation of the stored energy level over a wide range of energy storage, which regulatiton limits fluctuations to much smaller values than fluctuations or variations in line voltage.

A further object is to provide a device of this character which permits the use of rectifiers having lower voltage ratings than prior power supplies without compromise of performance or regulation.

A further object is to provide a power supply of this character wherein regulation is accomplished by application of output sampling principles in the control circuitry.

A further object is to provide a welding power supply of this character wherein the output voltage is compared to a stabilized reference voltage by means of summing resistors and the energy flow to the capacitors is adjusted to bring the sum of the reference voltage and the output voltage to equality with conduction trigger voltage of an energy flow controlling semiconductor used in the device.

A further object is to provide a device of this character wherein variations in the ratio of summing resistors with respect to a desired value controls the conduction angle at which semi-conductor devices are triggered in the operation of the device to transfer energy from a primary line to storage capacitors.

A further object is to provide a device of this character utilizing silicon controlled rectifiers to effect a transfer of energy from a primary line to a storage capacitor, one of said rectifiers having low power capabilities and high gate sensitivity, and a second rectifier having high power capabilities and low gate sensitivity, wherein the rectifier of high sensitivity is used to trigger the rectifier of high power.

A further object is to provide a device of this character including a disabling circuit which operates during the interval in which energy is released from the storage capacitors during the welding operation by controlling, by means of a resistor, a negative voltage applied to an energy flow controlling semiconductor to maintain the same below the trigger value of voltage required for functioning of that semiconductor.

Other objects will be apparent from the following specification.

Figure 2:
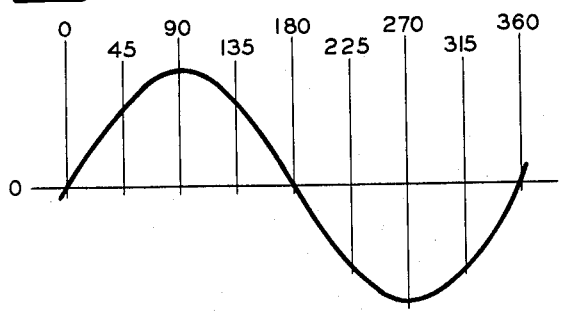
Figure 3:
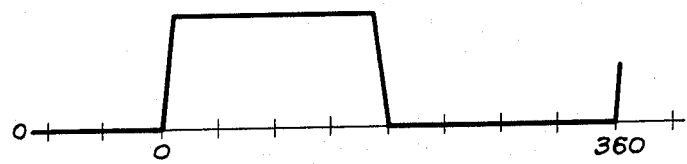
Figure 4:
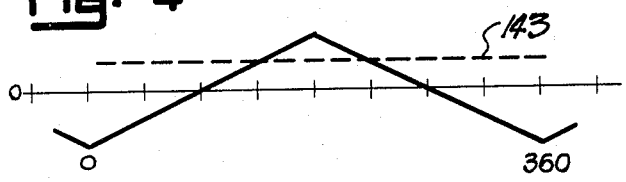
Figure 5:
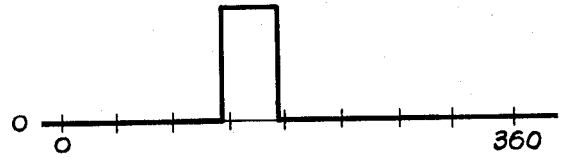
Figure 6:
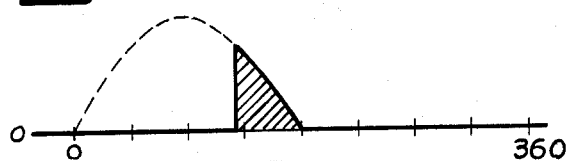
Figure 7:
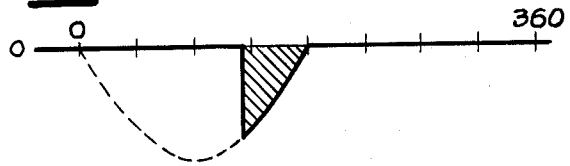

In the drawing,

FIG. 1 is a wiring diagram illustrating the invention;
FIG. 2 is a graph illustrating applied line voltage;
FIG. 3 is a graph illustrating the voltage in the circuit at one point thereof;
FIG. 4 is a graph illustrating the voltage in the circuit at another point thereof;
FIG. 5 is a graph illustrating the voltage in the circuit at still another point thereof;
FIG. 6 is a graph illustrating the primary voltage in the circuit at one point thereof; and
FIG. 7 is a graph illustrating the secondary voltage in the operating circuit at one point thereof.

In considering this invention the following definitions are applicable:

"Solid-state" is used to designate rare earth semiconductor devices which exhibit electrical characteristics similar to certain vacuum tubes and are used in electronic equipment in place of vacuum tubes.

"Regulated" is applied to indicate compensation against changes in output voltage or energy level setting due to changes in the applied line voltage.

"Stored energy" is used to refer to the principle wherein electrical energy is accumulated over a relatively long period of time, such as one second, for dissipation in a relatively short period of time, as from .0025 second to .005 second. When applied to resistance welding the ideal case occurs when the quantity of energy stored is closely regulated and is entirely dissipated in the form of heat of fusion intensity at the interface of two materials between which a fusion bond or weld is desired. Due to the short duration and high degree of concentration of this fusion heat there is negligible heat, in the order of only a few degrees, developed or propagated within a short distance, such as a fraction of an inch from the bond, in the materials being welded.

"Watt-second" is used to express energy storage which mathematically, with capacitor storage, can be expressed as: $WS$ equals $CE^2/2$, where C equals storage capacity in farads, and E equals voltage appearing across the capacitors in volts.

"Error voltage" is used to indicate the measured difference in voltage at a given point in a circuit between the trigger voltage applicable to a solid state device and the actual D.C. component of the voltage at the same point.

Referring to the drawings which are particularly applicable to a solid state regulated stored energy resistance welding power supply, the numeral 70 designates a switch which may be responsive to the pressure of welding electrodes 25 and 56 relative to work pieces 26 to be welded, or may be responsive to any other condition of welding apparatus or to a manual actuator. The switch 70 will preferably be of a low differential or snap action type which is normally maintained in closed circuit position.

The novel control circuit has lines 75 and 76 at which A.C. line voltage is applied and to which lines is connected the primary 77 of a transformer 78. The secondary 80 of the transformer 78 is connected in a circuit having a rectifier 81 preferably of the solid state type, a resistor 82 and one or more storage capacitors 83 interposed therein. A meter 130 is connected in parallel to capacitors 83.

A lead 84 connects lines 75 and 76 and has interposed therein a resistor 85 and a stabilizing zener rectifier 86. A lead 87 branches from lead 84 between the resistor 85 and the rectifier 86 and has interposed therein a rectifier 88, preferably of solid state type, and a resistor 89. Lead 87 is connected to a lead 90 having a capacitor 91 interposed in a portion thereof between lead 87 and line 76. Lead 90 in another portion thereof has interposed therein a resistor 92 and a variable resistor 93 and is connected by a lead 94 with the secondary transformer circuit containing the storage capacitors 83. The lead 90 also has interposed therein the switch 95 of a relay and the primary 96 of a welding transformer whose secondary 97 is connected to the welding electrodes 25 and 56.

A lead 98 extends from the welding transformer primary 96 to the line 76 and has connection by a lead 99 with the storage capacitor circuit. A lead 100 has interposed therein a coil 101 of a relay which controls the relay switch 95 and this lead 100 in turn is connected to one terminal of operating switch 70 connected by lead 102 to the line 75. The other terminal of switch 70 is connected by lead 103 to a lead 104 which interconnects line 76 and lead 90. Lead 103 has rectifier 105, such as a solid state element therein. Lead 103 is connected to lead 104 between a resistor 106 and a capacitor 107 interposed in lead 104.

A lead 108 extends between the lines 75 and 76 and is preferably connected to lead 98 and has interposed therein a resistor 109 and a limiting zener regulator 110. A lead 111 branches from lead 108 between the resistor 109 and zener regulator 110 and has interposed therein a control rectifier 112, preferably in the nature of a solid state element, and a resistor 113. A lead 114 connects the lead 111 between the rectifier 112 and resistor 113 with a rectifier 79, preferably a solid state member. A lead 115 extends from the control rectifier 112 to the lead 84 and has connection with lead 90. Lead 115 has interposed therein a resistor 116 and a capacitor 117. A lead 118 connects line 76 and lead 87 and has a capacitor 119 interposed therein. A lead 120 connects line 76 and lead 115 and has interposed therein zener regulators or limiters 121 and 122.

This circuit operates to effect close regulation of the stored energy level of the storage capacitors 83. This regulation is accomplished by application of output sampling principles in the control circuitry and essentially the output voltage is compraed to a stabilized reference voltage by means of summing resistors so the control automatically adjusts the energy flow to the capacitors 83 to result in the sum of the reference voltage and the output voltage being equal to the conduction trigger voltage of the control member, as 112. By changing the ratio of the summing resistors, the energy level is adjusted to the desired value by reference to the meter or other means 130. In the control circuits the conduction angle is automatically decreased when the energy level exceeds the desired set value read at meter 130 and conversely the conduction angle is automatically increased when the energy level is less than said desired set value.

Silicon controlled rectifiers 79 and 112 are used to control the transfer of energy from the primary line to the storage capacitors 83. These rectifiers operate in a manner similar to a thyratron in that, at the instant the voltage applied to the gate terminal reaches a threshold level when the anode to cathode voltage is positive, the device changes rapidly, i.e. in micro seconds, from a non-conductor to a very low resistance conductor. The action can be considered similar to closure of a switch or relay. Once conduction has begun, the gate of the rectifier loses the ability to control, and the device will not become a non-conductor until the anode voltage or current is reduced below a holding minimum for that particular device. This device, when operated within its design limits, will always be a non-conductor when the anode to cathode voltage is negative.

One characteristic of a silicon controlled rectifier is that, in general, the higher the power transfer rating of the rectifiers, the lower is its gate sensitivity. Because of this characteristic of silicon controlled rectifiers, two such units are used in this circuit, one rectifier 112 having low power capabilities and high gate sensitivity, and the second rectifier 79 having high power capabilities with low gate sensitivity. The high sensitivity unit 112 is used as a trigger for the high power unit 79 and has adequate gate sensitivity to respond to or correct for slight energy variations due to line voltage variation.

A zener operated semiconductor rectifier 86 is used to establish the stable reference voltage which is summed with the output voltage. The inherent characteristics of the rectifier 86 cause it to limit to a stable predetermined value the voltage which appears across its terminals.

The graphs illustrated in FIG. 2 to 7, inclusive, are helpful in considering the functioning of the device. For convenience the axis of the wave form in each is shown in degrees and 360 degrees corresponds to one complete cycle of the applied line voltage. The control circuit operation depends on automatic variation of the time phase relationship between the applied line voltage and the conduction point of the control rectifier 112 or 79. As the conduction angle is varied, two parameters are effected, (a) the total amount of energy transfered to the storage capacitors 83, and (b) the maximum D.C. voltage to which the capacitors 83 can charge. The conduction angle is illustrated in FIG. 5 as the extent of the square wave angle along the horizontal base line, and is illustrated in FIGS. 6 and 7 as the shaded area. In FIG. 5 the wave form is that observed at the base of the semiconductor member 112 at F. In FIG. 6 wave form is that observed between the primary of the voltage transformer 78 and reference point E. In FIG. 7 the voltage is observed between the secondary of the transformer 78 and the reference point E. A decrease in the conduction angle results in a decrease in both the energy and direct current voltage, whereas an increase in the conduction angle results in an increase in both the energy and the direct current voltage.

The applied line voltage is the usual sinusoidal alternating current voltage as shown in FIG. 2. FIG. 3 shows the wave form established at point A on FIG. 1. The flat or square wave designates the zener voltage level established by zener rectifier 86. This voltage is highly stable and will not change in value when the applied line voltage varies.

FIG. 4 is the wave form appearing at point B of FIG. 1. The dotted line 143 therein represents the trigger voltage of the gate of the control rectifier 112. This trigger level is a stable characteristic of the device and is not normally subject to change with time. The absolute or direct current level of the wave form as shown in FIG. 4 is the result of the vector addition of the reference positive voltage at point D in FIG. 1 and the power supply capacitor voltage at point C in FIG. 1 through resistors 89, 92 and 93.

Determination of the trigger voltage in the circuit of FIG. 1 can be made by first assuming that the reference positive voltage at D in FIG. 1 is equal to plus 25 volts, the D.C. power supply voltage at C is equal to minus 25 volts, and the resistor 93 is adjusted to zero resistance. By summing the voltage drops across resistors 92 and 89, assuming the above named equal value, we find that the direct current voltage component of the wave form on the gate of the control rectifier 112 (at point B) is zero with respect to the reference side of the line at point E. When a trigger voltage occurs equal to plus one volt, conduction will occur precisely at the crest of the A.C. component of the wave form curve of FIG. 3 and at the 165 degree phase position of the applied line voltage. The applied line voltage at this instant is equal to the product of its peak value, that is, its 90 deg. phase angle value, and the sine of the 165 deg. (0.263 peak value). Conduction of the triggering control rectifier 112 generates a voltage across resistor 113 which has adequate amplitude to trigger the power control rectifier 79 under all conditions. Conduction of rectifier 79 in turn applies the line voltage to the primary 77 of the transformer 78. The transformer then effects a transfer of energy from line voltage to the storage capacitors 83 through the rectifier 81. The theoretical maximum direct current voltage at point C is equal to the applied line voltage in the instant of conduction multiplied by the turns ratio of the transformer 78. The value of resistor 82 and the normal circuit losses occurring during the non-conduction portions of the applied line voltage cycle combine to reduce the theoretical peak value to less than the minimum desired stabilized value.

By adjusting resistor 93 to a resistance greater than zero, it is readily seen that the direct current component of voltage at point B of FIG. 1 will be positive with respect to point E, and the triggering rectifier 112 will trigger earlier in time phase with respect to the applied line voltage. This will result in conduction of triggering rectifier 112 and power rectifier 79 occurring earlier in the applied line voltage cycle, i.e., to the left of the position shown in FIGS. 5, 6 and 7. Hence the amplitude of the applied line voltage will be greater at the instant of triggering or conduction as is obvious from FIGS. 6 and 7, and the energy transferred to the capacitors 83 will be greater. The polarity is arranged in such a manner that this increased energy transfer increases the negative voltage at point C. This increase in negative voltage at point C causes the D.C. component of the voltage wave form at point B to be less positive, which in turn will trigger the rectifier 112 and cause conduction of power rectifier 79 later in time phase with respect to the next applied line voltage cycle. The energy transferred to the storage capacitor 83 during the next cycle will be less, and the net result is automatic adjustment of the conduction angle to result in a direct current output voltage equal to that value determined by the resistance ratio of the resistors 89 to 92 plus 93.

Should the line voltage either decrease or increase the conduction angle will automatically be adjusted by the regulating action of the circuit described above to result in the voltage of the storage capacitors 83 being maintained within the required limits of the preset level. If a 200 to 1 control range of stored energy is to be secured, the output voltage in watt seconds must be adjustable and be regulated over a range of 14.14 to 1.

The triangular shape of the A.C. component of the wave form of FIG. 4 is obtained by the action of capacitors 117 and 91 and resistor 116. This triangular wave form shape is necessary to prevent triggering of the control rectifiers 112 and 79 during the zero to 90 degree interval when the error voltage at point B in the circuit is less than one volt which represents the stabilized condition. Since this alternating current component is derived from the square wave of FIG. 3 at point A of the circuit, it is stabilized against changes in the applied line voltage.

The slope of the triangular alternating current component of voltage at point B of the circuit is determined by the requirements for regulation and circuit stability. If the slope were zero, conduction would occur in the zero to 90 degree range, and the energy applied to the storage capacitors 83 would cause excessive periodic overcharging at the lower output voltages. It is advantageous to have conduction occur only during the 90 degree to 180 degree period of the applied line voltage.

The zener regulators 110, 121 and 122 perform as limiters to prevent application of destructive voltages to the anode and gate of the controlling rectifiers 112 and 79.

The arrangement includes the provision of a disabling circuit which operates during the interval energy is being released from the storage capacitors 83 through the relay control switch 95. The components of this disabling circuit are rectifier 105, resistor 106 and capacitor 107. The disabling action is accomplished by applying a negative voltage to point B of the circuit through the resistor 106 which insures the wave form at point B will remain negative with respect to the trigger value as designated by line 143 in FIG. 4.

The application of the transformer 78 and the effect of this application upon the required rating of the power rectifier 79 and the rectifier 81 are unique features of this circuit. The peak inverse rating requirement of power rectifier 79 is equal to the peak applied line voltage. In no case can the voltage across the power rectifier exceed this value. Since current can flow in the primary 77 of the transformer 78, only during the positive half of the line applied cycle, the voltage appearing across the secondary is limited to a single polarity and this voltage cannot change from this polarity. Rectifier 81 will conduct energy into the storage capacitors 83 from this voltage when the peak magnitude exceeds the voltage across the storage capacitors 83. During the balance of the line applied cycle, rectifier 81 need only prevent or block discharge from the discharge capacitors 83 through the secondary 80 of the transformer 78. The peak inverse voltage rating of this rectifier 81 need only be equal to the maximum direct current voltage rating of the power supply plus any residual overshoot from transformer 78. The overshoot can be minimized by proper transformer design. In this connection previous power supplies using similar components have required a peak inverse rating of components equal to the peak applied voltage plus the maximum direct current output voltage.

By changing the turns ratio of the primary 77 and secondary 80 of the transformer 78, the value of the rectifier 81 and the values of the summing resistors 89, 92 and 93, this regulation can be configured to control within the same percentage regulation over any desired range of direct current voltage.

Automatic programming of stored energy can be easily accomplished by servo control or switching of the values of the resistor 93. The stored energy level can be shown to be approximated by $$W_s = \frac{C}{2}\left[E_z\left(\frac{R(92)+R(93)}{R(89)}\right)\right]^2$$

when $W_s$ = energy expressed in watt-seconds,
$C$ = capacity of 83 expressed in farads,
$E_z$ = Zener voltage of rectifier 86.

Resistor 93 would then be programmed in accordance with the above relationship, and to cover a 200 to 1 range of energy resistor 93 need only be adjusted over a range of zero to 13.14 times the value of resistor 92.

While the preferred embodiment of the invention has been illustrated and described, it will be understood that changes in the device may be made within the scope of the appended claims without departing from the spirit of the invention.

I claim:
1. A stored energy resistance welding power supply comprising
    an alternating current circuit having terminals,
    a stabilizing rectifier establishing a fixed reference voltage in said circuit,
    a transformer having a primary connected in said circuit and a secondary,
    a solid state control rectifier means in said circuit controlling energization of said transformer and having a stable trigger voltage level,
    variable resistance means in said circuit connected to said transformer secondary and to said stabilizing rectifier to sum the fixed reference voltage and the transformer output voltage and apply the same to said control rectifier means for controlling conduction of said control rectifier means during predetermined polarity of operating current,
    a storage capacitor connected to said transformer secondary,
    a welding transformer having a primary connected in parallel to said storage capacitor, and
    means controlling energization of said welding transformer.

2. A stored energy resistance welding power supply comprising
    an alternating current circuit having terminals,
    a stabilizing rectifier establishing a reference voltage across the terminals of said circuit,
    a transformer having a primary connected in said circuit and a secondary,
    a solid state control rectifier means in said circuit controlling energization of said transformer and having a predetermined trigger voltage level,
    variable resistance means in said circuit connected to said transformer secondary and to said stabilizing rectifier to sum the fixed reference voltage and the transformer output voltage and apply the same to said control retcifier means for controlling conduction of said control rectifier means during predetermined polarity of operating current, a storage capacitor connected to said transformer secondary, a welding transformer having a primary connected in parallel to said storage capacitor, means controlling energization of said welding transformer, and a rectifier connected in series with said storage capacitor.

3. A stored energy resistance welding power supply comprising
an alternating current circuit having terminals,
a stabilizing rectifier establishing a reference voltage across the terminals of said circuit,
a transformer having a primary connected in said circuit and a secondary,
a solid state control rectifier means in said circuit controlling energization of said transformer and having a predetermined trigger voltage level,
variable resistance means in said circuit connected to said transformer secondary and to said stabilizing rectifier to sum the fixed reference voltage and the transformer output voltage and apply the same to said control rectifier means for controlling conduction of said control rectifier means during predetermined polarity of operating current,
a storage capacitor connected to said transformer secondary,
a welding transformer having a primary connected in parallel to said storage capacitor, and
means controlling energization of said welding transformer,
said control rectifier means including a solid state member having high gate sensitivity connected to a solid state member having high power capabilities.

4. A stored energy welding power supply comprising an alternating current circuit having terminals,
a stabilizing rectifier establishing a reference voltage across the terminals of said circuit,
a transformer having a primary connected in said circuit and a secondary,
a solid state control rectifier means in said circuit controlling energization of said transformer and having a predetermined trigger voltage level,
variable resistance means in said circuit connected to said transformer secondary and to said stabilizing rectifier to sum the fixed reference voltage and the transformer output voltage and apply the same to said control rectifier means for controlling conduction of said control rectifier means during predetermined polarity of operating current,
a storage capacitor connected to said transformer secondary,
a welding transformer having a primary connected in parallel to said storage capacitor, and
means controlling energization of said welding transformer,
said control rectifier means including a semiconductor member of high power and low gate sensitivity triggered by a second semiconductor member of high gate sensititivity.

5. A stored energy resistance welding power supply comprising
an alternating current circuit having terminals,
a stabilizing rectifier establishing a reference voltage across the terminals of said circuit,
a transformer having a primary connected in said circuit and a secondary,
a solid state control rectifier means in said circuit controlling energization of said transformer and having a predetermined trigger voltage level, variable resistance means in said circuit connected to said transformer secondary and to said stabilizing rectifier to sum the fixed reference voltage and the transformer output voltage and apply the same to said control rectifier means for controlling conduction of said control rectifier means during predetermined polarity of operating current,
a storage capacitor connected to said transformer secondary,
a welding transformer having a primary connected in parallel to said storage capacitor, and
means controlling energization of said welding transformer,
said variable resistance means including a variable resistor and at least one fixed resistor connected in series.

6. A stored energy resistance welding power supply comprising
an alternating current circuit having terminals,
a stabilizing rectifier establishing a reference voltage across the terminals of said circuit,
a transformer having a primary connected in said circuit and a secondary,
semiconductor means in said circuit controlling energization of said transformer and having a conduction trigger voltage level,
an adjustable resistor for varying energy flow in said circuit,
a rectifier in series with said resistor,
a storage capacitor connected in said circuit in series with said resistor,
the secondary of said transformer feeding said storage capacitor,
a welding transformer having a primary connected in parallel to said storage capacitor, and
means controlling energization of said welding transformer,
said adjustable resistor being connected to said transformer secondary and to said stabilizing rectifier to sum the fixed reference voltage and the transformer output voltage and apply the same to said semiconductor means.

7. A stored energy resistance welding power supply comprising
an alternating current circuit,
a stabilizing rectifier establishing a reference voltage across the terminals of said circuit,
a transformer having a primary connected in said circuit and a secondary,
semiconductor control means in series with said transformer primary and having a conduction trigger voltage level,
a storage capacitor,
a rectifier,
adjustable resistance means connected in series with said rectifier and storage capacitor and in parallel to said transformer and semiconductor control means to sum the fixed reference voltage and the transformer output voltage and apply the same to said semiconductor control means,
the secondary of said transformer feeding said storage capacitor,
a welding transformer having a primary connected in parallel to said storage capacitor, and
means controlling energization of said welding transformer.

8. A stored energy resistance welding power supply comprising
an alternating current circuit having termials,
a stabilizing rectifier establishing a reference voltage across the terminals of said circuit,
a transformer having a primary connected in said circuit and a secondary,
a solid state control rectifier means in said circuit controlling energization of said transformer and having
a predetermined trigger voltage level,
a storage capacitor connected to said transformer secondary,
variable resistance means and rectifier means connected to cooperating in said circuit for varying the time-phase relationship between applied line voltage and the conduction point of the control means to control the transfer of energy to said storage capacitor through said transformer, and
a welding transformer connected in parallel to said storage capacitor,
said variable resistance means being connected to said transformer secondary and to said stabilizing rectifier to sum the fixed reference voltage and the transformer output voltage and apply the same to said solid state control rectifier means.

9. A stored energy resistance welding power supply comprising
an alternating current circuit having terminals
a stabilizing rectifier establishing a reference voltage across the terminals of said circuit,
a transformer having a primary connected in said circuit and a secondary,
a solid state control rectifier means in said circuit controlling energization of said transformer and having a predetermined trigger voltage level,
variable resistance means in said circuit connected to said transformer secondary and to said stabilizing rectifier to sum the fixed reference voltage and the transformer output voltage and apply the same to said control rectifier means for controlling conduction of said control rectifier means during predetermined polarity of operating current,
a storage capacitor connected to said transformer secondary,
a welding transformer having a primary connected in parallel to said storage capacitor,
means controlling energization of said welding transformer, and
means for controlling the shape of the wave form of the alternating current component stabilized by said first rectifier to regulate the point in the wave of current flow at which said control rectifier is triggered.

10. A stored energy resistance welding power supply comprising
an alternating current circuit having terminals,
a stabilizing rectifier establishing a reference voltage across the terminals of said circuit,
a transformer having a primary connected in said circuit and a secondary,
a solid state control rectifier means in said circuit controlling energization of said transformer and having a predetermined trigger voltage level,
variable resistance means in said circuit connected to said transformer secondary and to said stabilizing rectifier to sum the fixed reference voltage and the transformer output voltage and apply the same to said control rectifier means for controlling conduction of said control rectifier means during predetermined polarity of operating current,
a storage capacitor connected to said transformer secondary,
a welding transformer having a primary connected in parallel to said storage capacitor,
means controlling energization of said welding transformer, and
means for controlling the shape of the wave form of the alternating current component stabilized by said first rectifier to regulate the point in the wave of current flow at which said control rectifier is triggered,
said last named means including capacitance and resistance means connected to said control rectifier means.

11. A stored energy resistance welding power supply comprising
an alternating current circuit having terminals,
a stabilizing rectifier establishing a reference voltage across the terminals of said circuit,
a transformer having a primary connected in said circuit and a secondary,
a solid state control rectifier means in said circuit controlling energization of said transformer and having a predetermined trigger voltage level,
variable resistance means in said circuit connected to said transformer secondary and to said stabilizing rectifier to sum the fixed reference voltage and the transformer output voltage and apply the same to said control rectifier means for controlling conduction of said control rectifier means during predetermined polarity of operating current,
a storage capacitor connected to said transformer secondary,
a welding transformer having a primary connected in parallel to said storage capacitor,
means controlling energization of said welding transformer,
said control rectifier means including a semiconductor having an anode and a gate, and
means for limiting the voltage applied to said anode and gate.

12. A stored energy resistance welding power supply comprising
an alternating current circuit having terminals,
a stabilizing rectifier establishing a reference voltage across the terminals of said circuit,
a transformer having a primary connected in said circuit and a secondary,
a solid state control rectifier means in said circuit controlling energization of said transformer and having a predetermined trigger voltage level,
variable resistance means in said circuit connected to said transformer secondary and to said stabilizing rectifier to sum the fixed reference voltage and the transformer output voltage and apply the same to said control rectifier means for controlling conduction of said control rectifier means during predetermined polarity of operating current,
a storage capacitor connected to said transformer secondary,
a welding transformer having a primary connected in parallel to said storage capacitor,
means controlling energization of said welding transformer,
said control rectifier means including a semiconductor having an anode and a gate, and
zener regulators in said circuit for limiting the voltage applied to said anode and gate.

13. A stored energy resistance welding power supply comprising
an alternating current circuit having terminals,
a stabilizing rectifier establishing a reference voltage across the terminals of said circuit,
a transformer having a primary connected in said circuit and a secondary,
a solid state control rectifier means in said circuit controlling energization of said transformer and having a predetermined trigger voltage level,
variable resistance means in said circuit connected to said transformer secondary and to said stabilizing rectifier to sum the fixed reference voltage and the transformer output voltage and apply the same to said control rectifier means for controlling conduction of said control rectifier means during predetermined polarity of operating current,
a storage capacitor connected to said transformer secondary,
a welding transformer having a primary connected in parallel to said storage capacitor, means controlling energization of said welding transformer and a disabling circuit operable during energization of said welding transformer to maintain the current effective on said control rectifier means below said predetermined trigger voltage level.

14. A stored energy resistance welding power supply comprising an alternating current circuit having terminals, a stabilizing rectifier establishing a reference voltage across the terminals of said circuit, a transformer having a primary connected in said circuit and a secondary, a solid state control rectifier means in said circuit controlling energization of said transformer and having a predetermined trigger voltage level, variable resistance means in said circuit connected to said transformer secondary and to said stabilizing rectifier to sum the fixed reference voltage and the transformer output voltage and apply the same to said control rectifier means for controlling conduction of said control rectifier means during predetermined polarity of operating current, a storage capacitor connected to said transformer secondary, a welding transformer having a primary connected in parallel to said storage capacitor, means controlling energization of said welding transformer, a disabling circuit operable during energization of said welding transformer to maintain the current effective on said control rectifier means below said predetermined trigger voltage level, said disabling circuit including a series connected capacitor and resistor connected in parallel to said first transformer and said control rectifier and a rectifier connected in series with said first transformer and said control rectifier.

15. A storage energy resistance welding power supply, comprising an alternating current circuit having terminals, a stabilizing rectifier establishing a fixed reference voltage in said circuit, a transformer having a primary connected in said circuit and a secondary, a solid state control rectifier means in said circuit controlling energization of said transformer and having a stable trigger voltage level, variable resistance means in said circuit connected to said transformer secondary and to said stabilizing rectifier to sum the fixed reference voltage and the transformer output voltage and apply the same to said control rectifier means for controlling conduction of said control rectifier means during predetermined polarity of operating current, a storage capacitor connected to said transformer secondary, a welding transformer having a primary connected in parallel to said storage capacitor, and means controlling energization of said welding transformer, said control rectifier means being connected in said circuit in a manner to compensate for or regulate against the occurence of change in the energy level setting of said variable resistance means due to variation in the applied voltage.

16. A stored energy resistance welding power supply, comprising an alternating current circuit having terminals, a stabilizing rectifier establishing a fixed reference voltage in said circuit, a transformer having a primary connected in said circuit and a secondary, a solid state control rectifier means in said circuit controlling energization of said transformer and having a stable trigger voltage level, variable resistance means in said circuit connected to said transformer secondary and to said stabilizing rectifier to sum the fixed reference voltage and the tranformer output voltage and apply the same to said control recifier means for controlling conduction of said control rectifier means during predetermined polarity of operating current, a storage capacitor connected to said transformer secondary, a welding transformer having a primary connected in parallel to said storage capacitor, and means controlling energization of said welding transformer, said control means regulating the current to the primary of said first transformer whereby said control means have a lower voltage rating requirement than if connected to the secondary of said first transformer.

References Cited by the Examiner

UNITED STATES PATENTS

| | | | |
|---|---|---|---|
| 2,473,799 | 6/1949 | Klemperer | 219—113 |
| 2,521,880 | 9/1950 | Storm | 321—18 |
| 3,095,534 | 6/1963 | Cockrell | 321—46 |

FOREIGN PATENTS

| | | |
|---|---|---|
| 933,366 | 4/1948 | France. |

MILTON O. HIRSHFIELD, *Primary Examiner.*

LLOYD McCOLLUM, *Examiner.*